United States Patent
Gilbert et al.

(10) Patent No.: US 8,240,766 B2
(45) Date of Patent: Aug. 14, 2012

(54) DEVICE FOR ELECTRICALLY ADJUSTING A VEHICLE SEAT

(75) Inventors: Tassilo Gilbert, Pforzheim (DE); Dieter Jungert, Weissach (DE); Joachim Muller, Rutesheim (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 281 days.

(21) Appl. No.: 12/606,225

(22) Filed: Oct. 27, 2009

(65) Prior Publication Data

US 2010/0187396 A1    Jul. 29, 2010

(30) Foreign Application Priority Data

Jan. 28, 2009  (DE) .................. 10 2009 006 387

(51) Int. Cl.
*A47C 1/00* (2006.01)
(52) U.S. Cl. ............... 297/344.17; 297/344.15; 248/421
(58) Field of Classification Search ............ 297/344.15, 297/344.17; 248/421
See application file for complete search history.

(56) References Cited

U.S. PATENT DOCUMENTS

| | | | | |
|---|---|---|---|---|
| 2,809,688 A * | 10/1957 | Brundage | ............ | 248/419 |
| 2,839,124 A * | 6/1958 | Desmond et al. | ............ | 248/393 |
| 2,886,094 A * | 5/1959 | Pickles | ............ | 248/393 |
| 2,919,744 A * | 1/1960 | Tanaka | ............ | 248/419 |
| 2,931,424 A * | 4/1960 | Pickles | ............ | 248/419 |
| 3,405,900 A * | 10/1968 | Robinson | ............ | 248/396 |
| 3,894,708 A * | 7/1975 | Stanley | ............ | 248/394 |
| 4,040,591 A | 8/1977 | Pickles | | |
| 4,470,318 A * | 9/1984 | Cremer et al. | ............ | 74/353 |
| 4,850,645 A * | 7/1989 | Crockett | ............ | 297/330 |
| 5,427,345 A * | 6/1995 | Yamakami et al. | ............ | 248/394 |
| 5,470,129 A * | 11/1995 | Ferrero | ............ | 297/330 |
| 5,695,248 A * | 12/1997 | Bell | ............ | 297/344.17 |
| 5,806,824 A * | 9/1998 | Isomura et al. | ............ | 248/396 |
| 6,042,145 A | 3/2000 | Mitschelen et al. | | |
| 6,299,252 B1 | 10/2001 | Frohnhaus et al. | | |
| 6,309,019 B1 * | 10/2001 | Downey et al. | ............ | 297/344.1 |
| 6,478,378 B2 | 11/2002 | Muhlberger et al. | | |
| 6,666,508 B1 | 12/2003 | Hofmann et al. | | |
| 6,733,075 B2 | 5/2004 | Schumann et al. | | |
| 6,851,753 B2 * | 2/2005 | Akaike et al. | ............ | 297/344.17 |
| 6,921,058 B2 * | 7/2005 | Becker et al. | ............ | 248/419 |
| 7,044,543 B2 | 5/2006 | Schumann et al. | | |
| 7,077,471 B2 | 7/2006 | Schumann et al. | | |
| 7,600,815 B2 * | 10/2009 | Corcoran | ............ | 297/339 |
| 7,631,939 B2 * | 12/2009 | Wulf et al. | ............ | 297/344.13 |
| 7,775,592 B2 * | 8/2010 | Becker et al. | ............ | 297/344.17 |

(Continued)

FOREIGN PATENT DOCUMENTS

DE       1 121263       1/1962

(Continued)

*Primary Examiner* — Laurie Cranmer
(74) *Attorney, Agent, or Firm* — Gerald E. Hespos; Michael J. Porco

(57) ABSTRACT

A device is provided for electrically adjusting a vehicle seat (1). The device has left and right articulated constructions (6, 6) arranged respectively on left and right sides (3, 4) of the vehicle seat (1). The device also has at least one electric motor (13) coupled to left and right gear mechanisms (10) for moving the respective left and right articulated constructions (6, 6) and left and right locking mechanisms (11) for locking the respective left and right articulated constructions (6, 6). The design permits a precise adjustment of the vehicle seat and secure locking of the vehicle seat in the event of a crash.

16 Claims, 3 Drawing Sheets

U.S. PATENT DOCUMENTS

| | | | |
|---|---|---|---|
| 7,780,235 B2 * | 8/2010 | Teufel et al. | 297/344.15 |
| 7,887,133 B2 * | 2/2011 | Perk | 297/344.15 |
| 7,926,876 B2 * | 4/2011 | Zadai et al. | 297/344.17 |
| 2003/0160483 A1 | 8/2003 | Becker et al. | |

FOREIGN PATENT DOCUMENTS

| | | |
|---|---|---|
| DE | 196 31 454 | 2/1998 |
| DE | 196 51 670 | 2/1998 |
| DE | 298 14 449 | 1/1999 |
| DE | 199 11 786 | 9/2000 |
| DE | 199 53 630 | 5/2001 |
| DE | 101 37 298 | 10/2002 |
| DE | 103 06 827 | 9/2004 |
| DE | 103 06 828 | 9/2004 |
| EP | 0 245 650 | 11/1987 |
| GB | 2 065 464 | 7/1981 |
| JP | 2008-24014 | 2/2008 |
| WO | 99/05000 | 2/1999 |

* cited by examiner

DEVICE FOR ELECTRICALLY ADJUSTING A VEHICLE SEAT

CROSS-REFERENCE TO RELATED APPLICATIONS

This application claims priority under 35 USC 119 to German Patent Application No. 10 2009 006 387.0 filed on Jan. 28, 2009, the entire disclosure of which is incorporated herein by reference.

BACKGROUND OF THE INVENTION

1. Field of the Invention

The invention relates to a device for electrically adjusting a vehicle seat, with articulated constructions arranged on different sides of the vehicle seat, and with at least one electric motor with a gear mechanism coupled thereto for moving the articulated constructions, and with at least one mechanism for locking the articulated constructions.

2. Description of the Related Art

An electric motor with a gear mechanism unit coupled thereto customarily is provided for electrically adjusting articulated constructions arranged on the right and left side of the vehicle seat. The articulated constructions are moved by the gear mechanism unit to adjust the vehicle seat with regard to the height adjustment of the vehicle seat, the inclination adjustment of a seat cushion of the vehicle seat or the inclination position of a backrest of the vehicle seat. The electric motor with a gear mechanism unit coupled thereto adjust the articulated construction on the one side of the vehicle seat. The electric adjustment unit also forms a lock for the articulated construction on the corresponding side of the vehicle seat when the electric adjustment unit is in the inoperative state to keep the vehicle seat securely in its position. The articulated construction on the other side of the vehicle seat also has to be locked to ensure secure locking of the vehicle seat even in the event of a crash and the high forces occurring in the process. It is known for this purpose to use a force transmission tube that couples the left and the right articulated construction to each other and thereby transfers the locking force to the side without the electric adjustment unit. The force transmission tube is relatively heavy and also is flexible. Therefore the force transmission tube leads to an asymmetrical positioning of the vehicle seat due to the one-sided locking in the event of a crash.

DE 199 11 786 C2, JP 2008 024014 A and EP 0 245 650 A2 each describe an inertia drive for a crash locking of an adjustment device of a motor vehicle seat.

U.S. Pat. No. 6,902,234 B2, U.S. Pat. No. 4,040,591, GB 2 065 464 A and WO 99/05000 all relate to various embodiments of mechanical crash locks for adjustment devices of vehicle seats.

DE 199 53 630 C5, DE 101 37 298 C1, DE 103 06 827 B4, DE 103 06 828 B4 and EP 1 121 263 B1 each relate to a crash lock with the use of an additional load path in the case of a vehicle seat.

It is the object of the present invention to develop a device of the type described that ensures a precise adjustment of the vehicle seat and secure locking of the vehicle seat in the event of a crash.

SUMMARY OF THE INVENTION

The invention relates to a device with a gear mechanism for moving the articulated construction arranged on a particular side of the vehicle seat and a mechanism for locking the articulated construction arranged on each of the different sides of the vehicle seat.

Each articulated construction preferably is assigned a dedicated locking mechanism and hence the articulated constructions arranged on the different sides of the vehicle seat are locked directly. The locking takes place on the respective side of the vehicle seat. Hence, the locking mechanisms and the gear mechanisms can be designed to be correspondingly smaller and lighter than if a single mechanism is used.

The locking of the articulated constructions takes place on both sides of the vehicle seat. Therefore, no asymmetry is produced either when adjusting the vehicle seat or in the event of a crash.

The gear mechanism and the mechanisms for locking the articulated construction preferably are arranged symmetrically with respect to a surface that is arranged in the longitudinal direction of the vehicle seat and in the widthwise center of the vehicle seat. The surface therefore constitutes the seat center surface.

The gear mechanisms arranged on the different sides of the vehicle seat, in particular the gear mechanisms arranged symmetrically with respect to the seat center surface, can be driven in different ways. For example, a single electric motor may be coupled to the gear mechanisms, and the electric motor may be arranged centrally with respect to the symmetrical surface. Thus, the electric motor may be connected to the gear mechanism by flexible shafts. On the other hand, two electric motors may be provided. One electric motor may be arranged on the one vehicle side and may be coupled to the gear mechanism arranged there, and the other electric motor may be arranged on the other vehicle side and may be coupled to the gear mechanism arranged there. These two electric motors preferably are in arranged symmetrically with respect to the symmetrical surface. The electric motors preferably are connected by a synchronization shaft to ensure synchronism of the electric motors.

The gear mechanisms used in the device preferably are of identical design. In the situation in which each gear mechanism is assigned an electric motor, the respective electric motor and the gear mechanism assigned thereto constitute a constructional unit.

The symmetrical arrangement of the system give rise to an increase in comfort. Furthermore, the symmetrical locking units contribute to the positive crash behaviour of the system. This also enables the weight of the system to be reduced and possibly also the costs.

The mechanism for locking the associated articulated construction can be designed in different ways. For example, the locking mechanism may be a self-locking mechanism, a centrifugal lock, an inertia lock and/or an electrically triggerable lock. The mechanism for locking the associated articulated construction may be formed separately to the assigned gear mechanism or may be integrated into the gear mechanism. In the latter case, the gear mechanism is a self-locking gear mechanism. The arrangement can be structurally compact when the mechanism for locking the associated articulated construction is integrated into the gear mechanism.

The articulated constructions function to adjust the vehicle seat with regard to a height adjustment of the vehicle seat, an inclination adjustment of a seat cushion of the vehicle seat and/or inclination adjustment of a backrest of the vehicle seat. The respective articulated constructions may differ in design. According to preferred designs, the respective articulated construction is designed as a single-part lever that is mounted pivotably at both ends, or as a toggle lever that is mounted pivotably at both ends.

Further advantages and features of the invention emerge from the dependent claims and from the description below of a number of exemplary embodiments of the invention without being restricted thereto.

DETAILED DESCRIPTION OF THE PREFERRED EMBODIMENTS

Figure 1:
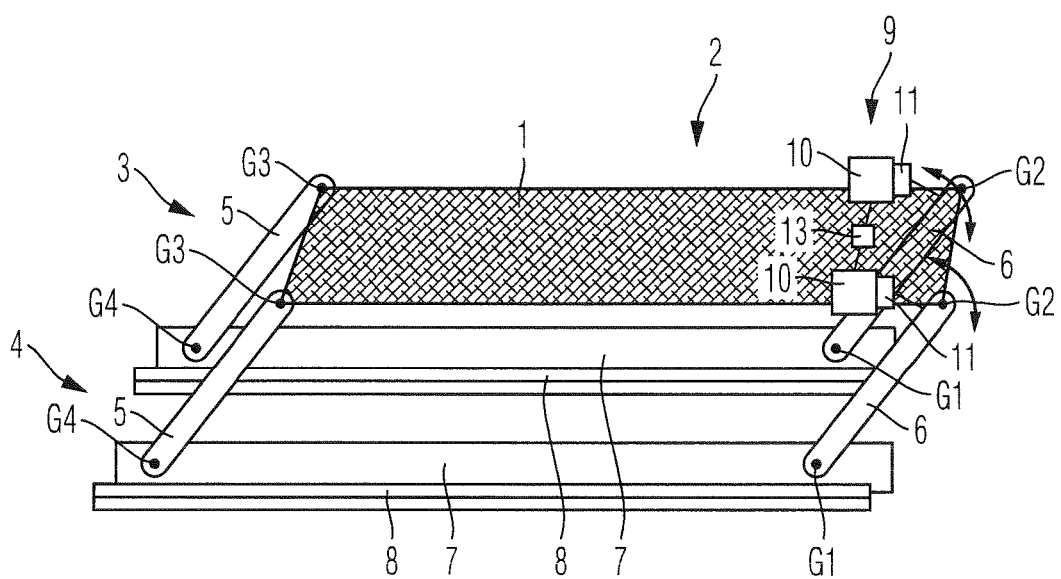
FIG. 1 is a schematic three-dimensional view of the mounting of a height-adjustable seat part of a vehicle seat together with a device according to the invention for electrically adjusting the height of the vehicle seat.

FIG. 1 is a substantially horizontally arranged seat part 1 of a vehicle seat 2, for example a driver's seat or passenger's seat of a passenger vehicle.

The seat part has a right side 3 and a left side 4 with respect to the direction of travel of the motor vehicle. A front lever 5 and a rear lever 6 are provided on each of the right and left sides 3 and 4. Each rear lever 6 has a lower end in a rail upper part 7 of the vehicle seat 2 in a manner to pivot about a joint G1. The two rail upper parts 7 are arranged parallel to each other and are positioned in the longitudinal direction of the vehicle. The rail upper parts 7 are mounted displaceably in rail lower parts 8 that are mounted in a stationary manner to the motor vehicle floor (not illustrated). Locking elements (not illustrated) can selectively lock the rail upper parts 7 in defined positions with respect to the rail lower parts 8 and therefore lock the vehicle seat 2 in different longitudinal positions.

The upper end of each rear lever 6 is mounted in the rear region of the seat part 1, in a manner to pivot about a joint G2.

The upper end of each front lever 5 is mounted in the region of the front end in the vehicle seat 2 to pivot about a joint G3. The lower end of each front lever 5 is mounted in a front region of the associated rail upper part 7 to pivot about a joint pin G4.

The levers 5 and 6 are inclined obliquely to the rear from the lower bearings G4 and G1 of the levers 5 and 6 and are aligned parallel to each other.

FIG. 1 does not show a backrest of the vehicle seat 2, which is arranged at a rear region of the seat part 1. FIG. 1 also does not show elements of the vehicle seat that may be provided to change the inclination of a component of the seat cushion of the seat part 1.

The seat part 1 of FIG. 1 is adjusted in height by introducing a torque in the region of the pivots G2 of the two rear levers 6. The rear levers 6 thus are pivoted in the region of their upper end relative to the seat part 1. As a result the parallel link construction causes a substantially parallel raising or lowering of the seat part 1.

Figure 2:
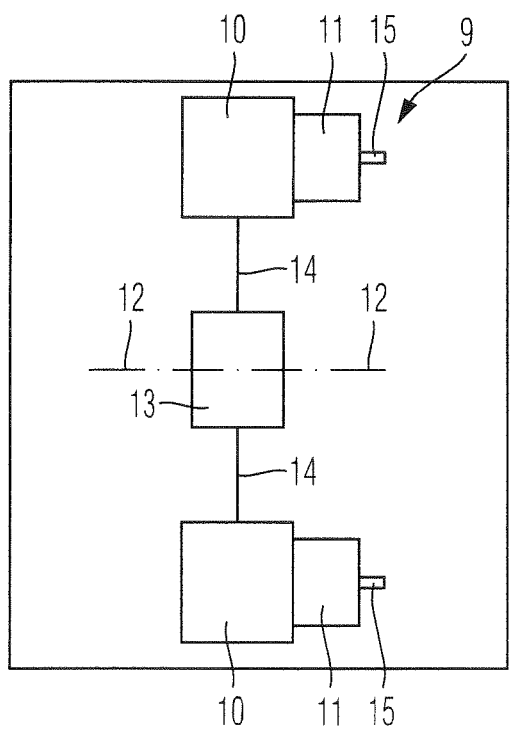
FIG. 2 is a schematic diagram of the essential components of the device used in the embodiment of FIG. 1 for electrically adjusting the vehicle seat.

FIGS. 1 and 2 illustrate the device 9 for electrically adjusting the seat part 1 of the vehicle seat 2. The device 9 has two substantially identical gear mechanisms 10 disposed respective on the sides 3 and 4 of the seat part 1 in addition to the articulated levers 5 and 6. The gear mechanisms 10 are operative for moving the rear levers 6 on the respective sides 4 and 5. The device 9 further has locking mechanisms 11 assigned respectively to the gear mechanisms 10 for locking the associated lever 6. The gear mechanisms 10 and the locking mechanisms 11 are arranged symmetrically with respect to a seat center plane 12 that extends perpendicularly to half the seat part width in the longitudinal direction of the seat part 1. A single electric motor 13 is coupled to the two gear mechanisms 10. The electric motor 13 is arranged centrally and symmetrically with respect to the seat center plane 12 and is connected to the gear mechanisms 10 via flexible shafts 14. The locking mechanism 11 for locking the respective assigned lever 6 is, for example, a self-locking mechanism, a centrifugal lock and/or an inertia lock. The locking mechanism 11 can be integrated in the assigned gear mechanism 10. In this case, the gear mechanism 10 preferably is a self-locking gear mechanism. The gear mechanism 10 of FIG. 1 has a mechanical main drive pinion 15 that acts on the rear lever 6 in the region of the joint pins G2, which are connected in a rotationally fixed manner to the respective rear lever 6 and the main drive pinion 15.

The height adjustment illustrated in FIG. 1 of the seat part 1, which is in particular the seat cushion of the vehicle seat, alternatively could take place at any of the other joints G1, G3 or G4.

Figure 3:
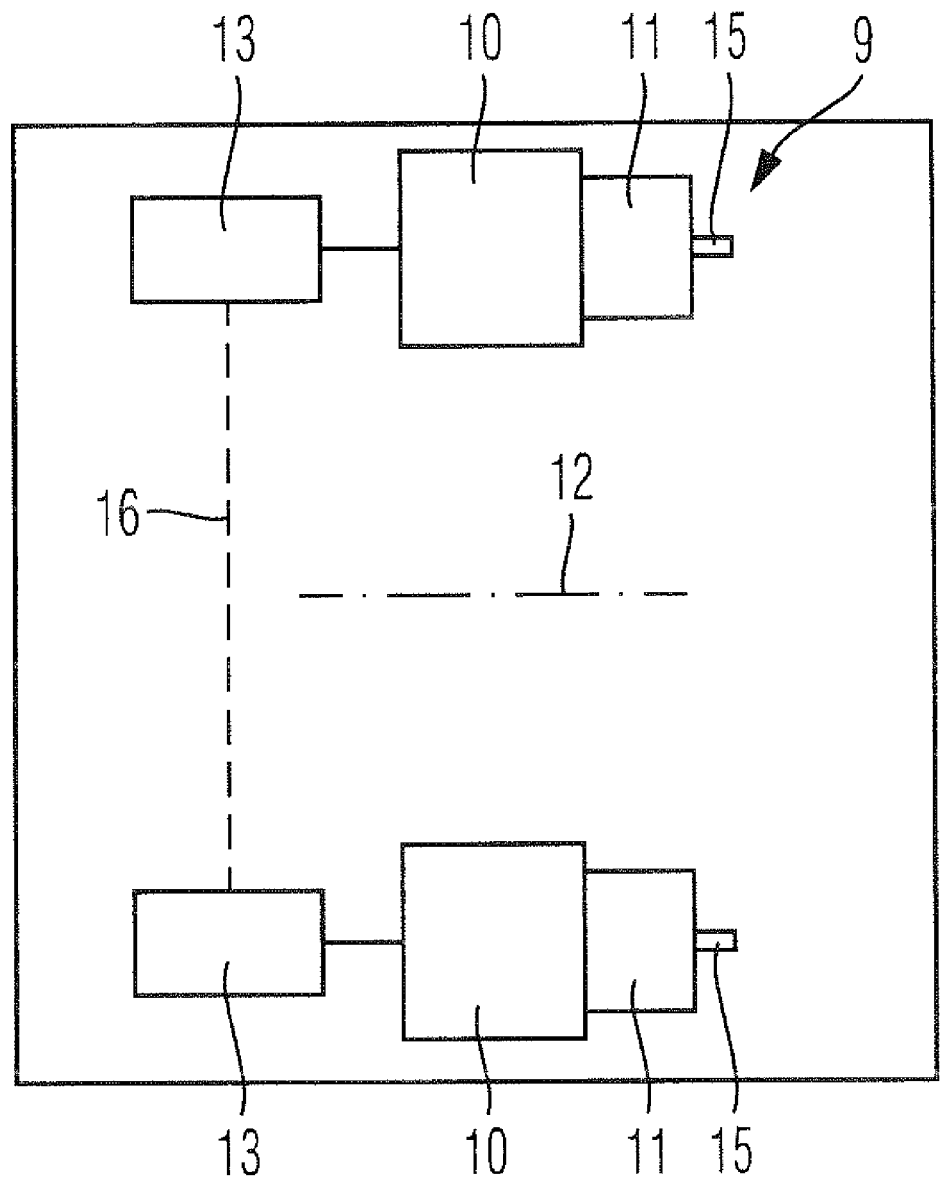
FIG. 3 is a schematic diagram as in FIG. 2 for a modified device for electrically adjusting the vehicle seat.

FIG. 3 shows a modification of the embodiment of FIG. 2. More particularly, two electric motors 13 are provided in the embodiment of FIG. 3 instead of the one electric motor in the embodiment of FIG. 2. Each electric motor 13 in FIG. 3 is arranged on the side of the respective gear mechanism 10 and directly drives the respective gear mechanism 10. The electric motors 13 are arranged symmetrically with respect to the seat center plane 12, and each electric motor 13 forms a constructional unit with the associated gear mechanism 10. The two electric motors 13 optionally may be connected by a synchronization shaft 16.

Figure 4:
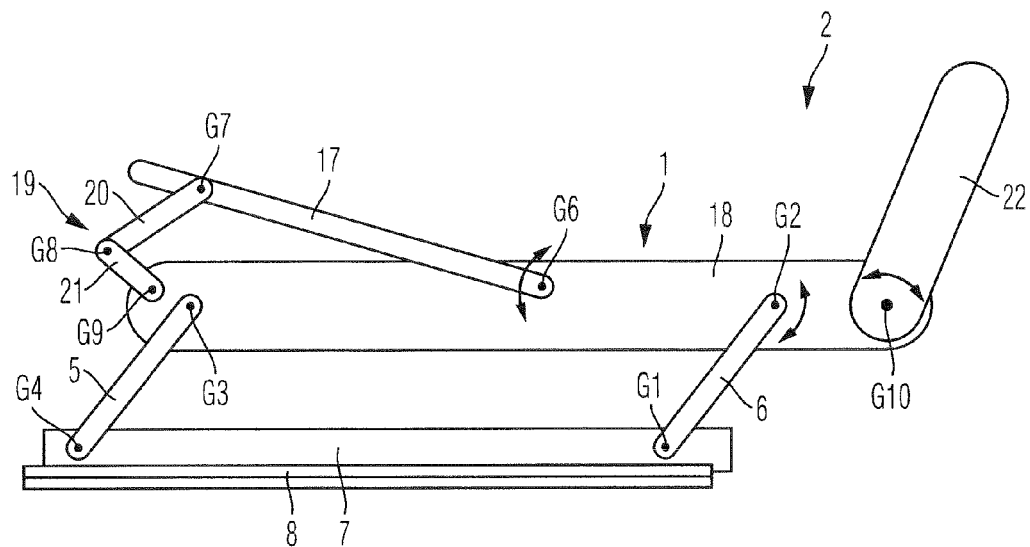
FIG. 4 is a schematic side view of the seat part of FIG. 1 mounted in the seat rails, with an additionally illustrated mounting of the backrest of the vehicle seat in the seat part and a design of the vehicle seat for changing the inclination of a seat cushion of the seat part.
Figure 5:
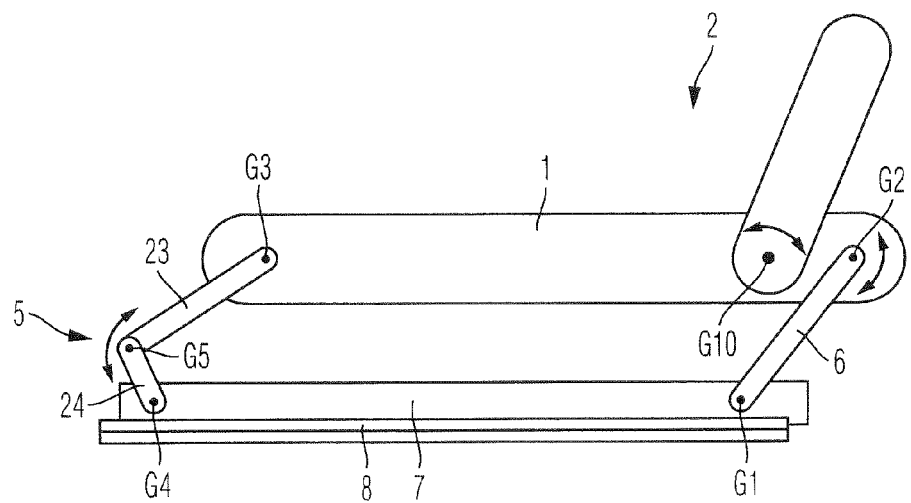
FIG. 5 is a side view of a further modified vehicle seat illustrated to show the seat part thereof and backrest thereof, but with the mounting of the seat part in seat rails on both sides in each case via a rear single-part lever and a front toggle lever.

FIGS. 4 and 5 illustrate vehicle seats 2 that are modified from the design of FIG. 1 with respect to the points of engagement of the mechanical main drive pinions 15 on both sides of the vehicle seat 2. The respective electric motor 13, the respective gear mechanism 10 and the respective locking mechanism 11 of the preceding illustrations are omitted from FIGS. 4 and 5 for simplicity.

In the embodiment according to FIG. 4, the seat part 1 is mounted via the levers 5 and 6 substantially as in the embodiment of FIG. 1. In contrast to the embodiment of FIG. 1, the front half of the seat part 1 has an adjustment device for adjusting the seat cushion inclination. More particularly, the vehicle seat 2 of FIG. 4 has a seat cushion 17 with opposite left and right sides and opposite front and rear ends. The rear end of the seat cushion 17 is mounted at the opposite left and right sides to seat side structures 18 of the seat part 1 and can pivot about joint pins G6. Front toggle lever assemblies 19 are mounted in the region of the front end of the seat cushion 17 on each side of the seat cushion 17. Each toggle lever assembly 19 has lever arms 20 and 21 that are connected pivotably to each other at a joint point G8. The end of each lever arm 20 opposite the lever arm 21 is connected pivotably to the seat cushion 17 at a joint pin G7. Each lever arm 21 has a lower end connected pivotably to the associated seat side structure 18 at a joint point G9.

A backrest 22 is mounted to rear regions of the respective seat side structures 18 and can be pivoted about a joint point G10 to adjust the inclination of the backrest 22.

In the embodiment according to FIG. 4, the point of engagement of the mechanical main drive pinion 15 of the seat cushion height adjuster can be on the joints G1, G2, G3 or G4. The point of engagement of the mechanical main drive pinion 15 of the seat cushion inclination adjuster can be on the joints G6, G7, G8 or G9. The point of engagement of the mechanical main drive pinion 15 of the backrest inclination adjuster can be on the joint G10.

The embodiment of FIG. 5 has a seat cushion 17, which, in contrast to the embodiment according to FIG. 4, is not provided as a subregion of the seat part 1. Rather the entirety of the seat part 1 of FIG. 5 can be adjusted in height and inclination. For this purpose, toggle lever assemblies 5 are arranged on both sides of the seat part 1. Each toggle lever assembly 5 has an the upper lever arm 23 and a lower lever arm 24 that are connected pivotably to one another at a joint point G5. The end of the upper lever arm 23 opposite the lower lever arm 24 is mounted in the seat part 1 to pivot about a joint pin G3. The end of the lower lever arm 24 opposite the upper lever arm 23 is mounted in the rail upper part 7 to pivot about the joint pin G4.

In the embodiment according to FIG. 5, the point of engagement of the mechanical main drive pinion 15 of the seat part height adjuster is on the joints G1, G2, G3 or G4. The point of engagement of the mechanical main drive pinion 15 of the seat part inclination adjuster can be on the joints G3, G4 or G5. The point of engagement of the mechanical main drive pinion 15 of the backrest inclination adjuster is on the joint G10.

All of the joints G1 to G10 are joints the permit the respective component to pivot at the joint about a horizontal axis arranged transversely with respect to the longitudinal direction of the vehicle.

What is claimed is:

1. A device for electrically adjusting a vehicle seat, the vehicle seat having opposite left and right sides, the device comprising:
   left and right articulated constructions arranged respectively on the left and right sides of the vehicle seat, each of the articulated constructions having at least two pivot joints;
   at least one electric motor;
   left and right gear mechanisms coupled to the at least one electric motor and disposed respectively on the opposite left and right sides of the vehicle seat, the left and right gear mechanisms being provided respectively with left and right drive pinions acting on one of the pivot joints of one of the respective left and right articulated constructions for moving the respective left and right articulated constructions, the left and right gear mechanisms being disposed on a seat part that is movable toward and away from a vehicle floor; and
   left and right locking mechanisms disposed respectively on the opposite left and right sides of the vehicle seat and configured for locking the respective left and right articulated constructions.

2. The device of claim 1, wherein the left and right gear mechanism and the left and right locking mechanisms are arranged symmetrically with respect to a plane arranged in a longitudinal direction of the vehicle seat and in a center of the vehicle seat with respect to a width of the vehicle seat.

3. The device of claim 2, wherein a single electric motor is coupled to the left and right gear mechanisms, the electric motor being arranged substantially centrally with respect to the plane arranged in the longitudinal direction of the vehicle seat and in the center of the vehicle seat with respect to the width of the vehicle seat.

4. The device of claim 3, wherein the electric motor is connected to the left and right gear mechanisms via flexible shafts.

5. The device of claim 2, wherein the left and right gear mechanisms are of substantially identical design.

6. The device of claim 2, wherein the at least one electric motor comprises left and right electric motors disposed respectively on the left and right sides of the vehicle seat, the left electric motor being coupled to the left gear mechanism, and the right electric motor being coupled to the right gear mechanism, the left and right electric motors being arranged symmetrically with respect to the symmetrical plane.

7. The device of claim 1, wherein each of the respective locking mechanisms is selected from the group consisting of a self-locking mechanism, a centrifugal lock, an inertia lock and an electrically triggerable lock.

8. The device of claim 1, wherein each of the locking mechanisms is integrated into the respective gear mechanism.

9. The device of claim 1, wherein each of the articulated constructions is configured to adjust at least one of a height and an inclination of at least one part of the vehicle seat.

10. The device of claim 1, wherein each of the respective articulated constructions is a single-part lever mounted pivotably at both ends.

11. The device of claim 1, wherein each of the respective articulated constructions is a toggle lever mounted pivotably at both ends.

12. The device of claim 1, wherein one of the pivot joints of each of the articulated constructions is provided on the vehicle seat, the drive pinions acting on the pivot joints of the respective articulated constructions that are on the vehicle seat.

13. The device of claim 1, wherein the left and right articulated constructions include front and rear left articulated constructions and front and rear right articulated constructions, the left and right drive pinions acting respectively on the rear left articulating construction and the rear right articulating construction.

14. A device for electrically adjusting a vehicle seat, the vehicle seat having opposite left and right sides, the device comprising:
   left and right articulated constructions respectively on the left and right sides of the seat;
   left and right electric motors disposed respectively on the left and right sides of the vehicle seat, a synchronization shaft connecting the left and right electric motors;
   left and right gear mechanisms coupled respectively to the left and right electric motors and disposed respectively on the opposite left and right sides of the vehicle seat for moving the respective left and right articulated constructions; and
   left and right locking mechanisms disposed respectively on the opposite left and right sides of the vehicle seat and configured for locking the respective left and right articulated constructions.

15. The device of claim 14, each respective electric motor and the gear mechanism assigned thereto constitute a constructional unit.

16. A device for electrically adjusting a vehicle seat, the vehicle seat having opposite left and right sides, the device comprising:

left and right articulated constructions respectively on the left and right sides of the seat;
at least one electric motor;
left and right gear mechanisms coupled to the electric motor and disposed respectively on the opposite left and right sides of the vehicle seat for moving the respective left and right articulated constructions; and
left and right locking mechanisms disposed respectively on the opposite left and right sides of the vehicle seat and configured for locking the respective left and right articulated constructions, wherein the left and right locking mechanisms are integrated respectively into the associated left and right gear mechanisms, and each of the left and right gear mechanisms being a self-locking gear mechanism.

* * * * *